No. 874,654. PATENTED DEC. 24, 1907.
F. BEAUDRY.
MOUSE TRAP.
APPLICATION FILED JULY 8, 1907.
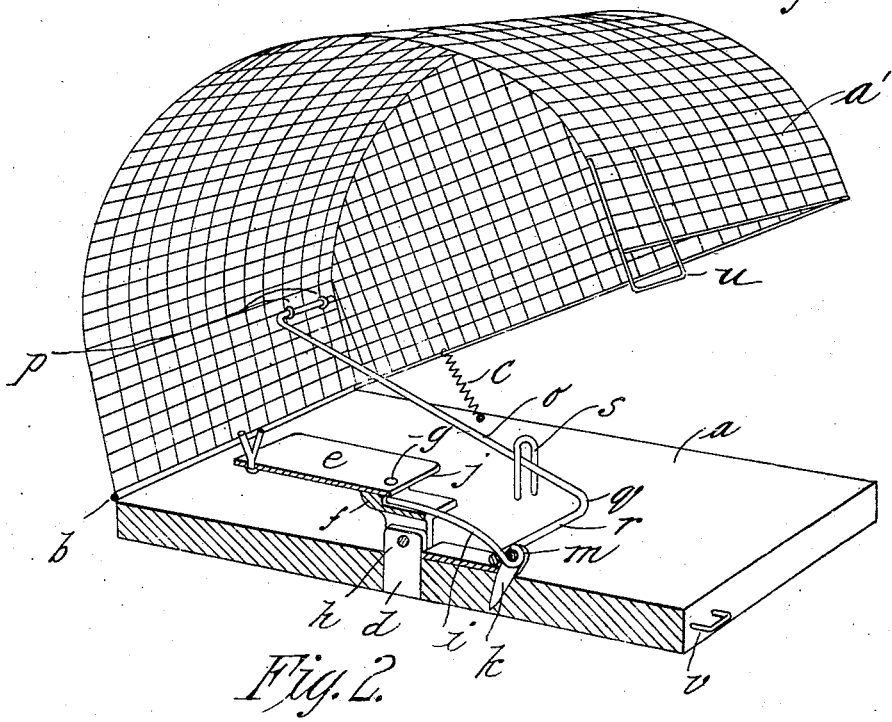
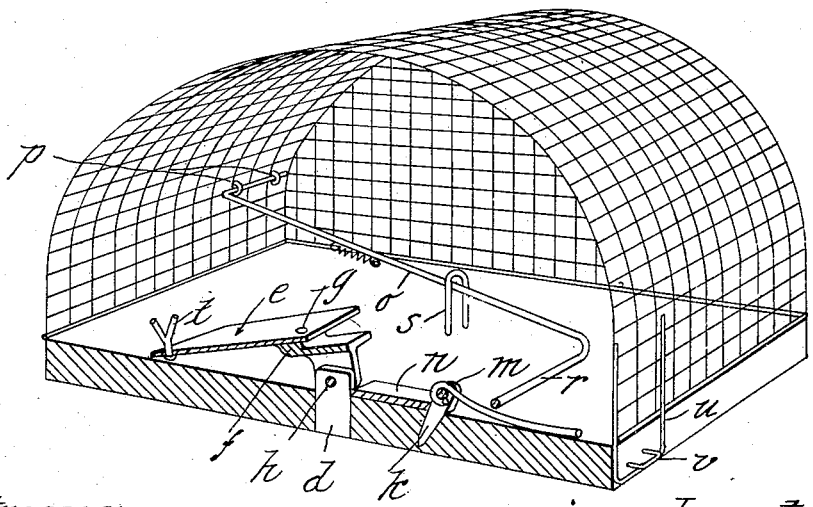
Witnesses:
H. L. Sprague
H. W. Bowen
Inventor:
Frederick Beaudry.
by Chapin & Co.
Attorneys.

UNITED STATES PATENT OFFICE.

FREDERICK BEAUDRY, OF SPRINGFIELD, MASSACHUSETTS.

MOUSE-TRAP.

No. 874,654.     Specification of Letters Patent.     Patented Dec. 24, 1907.

Application filed July 8, 1907. Serial No. 382,569.

*To all whom it may concern:*

Be it known that I, FREDERICK BEAUDRY, a citizen of the United States of America, residing at Springfield, in the county of Hampden and State of Massachusetts, have invented new and useful Improvements in Mouse-Traps, of which the following is a specification.

This invention relates to improvements in traps and particularly for traps used for catching mice or other rodents.

The object of the invention is to provide a simple and inexpensive structure and yet one that is sure in its action.

Broadly considered, the invention consists in pivotally mounting a cover on a suitable platform or base-piece at one end thereof, and having a suitable link connection between the cover and trip mechanism which is carried by the platform, whereby when the trip mechanism is operated, the cover will be given a quick motion downward onto the platform to entrap the rodent, as will be fully described in the body of the specification.

In the drawings forming part of this application,—Figure 1 is a perspective view of my improvement showing the cover in an elevated position and the trap set. Fig. 2 is a perspective view showing the trap sprung. Both of these views are longitudinal sectional ones through the supporting means for the trip mechanism.

Referring to these drawings in detail, $a$ designates the base-piece or platform of the trap to which the cover $a^1$ is secured at one end by means of a suitable hinge connection $b$. Extending between the base and the cover is a retractile spring $c$, normally tending to close the cover.

$d$ designates a post mounted in the base-piece $a$ and extending above the upper surface of the same for pivotally supporting the bait or trip-plate $e$ that is secured to the piece $f$ by means of the rivets $g$, the piece $f$ being pivotally connected to the post $d$ at the point $h$. It will be noticed that the forward edge of the plate $e$ overhangs the part $f$ so as to receive the free end of the trigger $i$. This overhanging part is designated by the letter $j$. The trigger $i$ (which preferably consists of a short piece of wire) is pivotally connected to the base-piece $a$ by means of the post $k$, at the point $m$. It will also be observed that the trigger $i$ is slightly curved, the purpose of which will be referred to in the operation of the trap.

Extending between the posts $d$ and $k$ is a small metal plate $n$.

$o$ designates a link pivotally connected to the cover by means of the staples $p$. This link is bent at right angles to the main portion thereof at the point $q$ so that the end $r$ rests on, and is slightly elevated from, the platform $a$ by means of the plate $n$ in the set position of the trap, as shown in Fig. 1. For the purpose of guiding the lower end of the link $o$ and limiting the upward movement to which the cover can be lifted, a staple $s$ is driven into the base-piece.

$t$ designates a pointed piece secured to the plate $e$ for holding the bait.

Referring to Fig. 1, in setting the trap, the cover is elevated so that the end $r$ of the link is drawn over onto the plate $n$ from the position shown in Fig. 2 to that shown in Fig. 1. The trigger $i$ is then rotated to bring its free end under the overhanging part $j$ of the bait-plate $e$; then by lifting this plate to a position substantially parallel with the base-piece and allowing the weight of the cover to be brought onto the trigger $i$, the bait-plate will be retained in this position. When the plate $e$ is slightly depressed, the trigger is readily released by a slight pressure on the same in connection with the force exerted by the weight of the cover $a^1$ to turn the trigger $i$ backward, as shown in Fig. 2. After the trigger is released, the weight of the cover will operate or throw the trigger to the position shown in Fig. 2, as readily understood, the spring $c$ aiding in the quick action of the downward movement of the cover. A spring-catch $u$ carried by the cover snaps over the staple $v$ in the base-piece when the cover falls, thereby retaining the same in a closed position. The trigger $i$, by reason of its slight curvature, readily permits the end $r$ of the link $o$ to slide towards the free end of the same after being tripped, thus allowing the part $r$ to readily pass over the post $k$ without any danger of catching.

What I claim, is:—

1. In a trap of the kind described comprising a base-piece, a cover pivotally secured to the same, a link extending between the cover and base-piece, and trip mechanism carried by the base-piece and engaged by the link, a bait-plate, the trip mechanism comprising a post to which the bait-plate is secured, said bait-plate having an overhanging part, a trigger pivotally connected to the base-piece and adapted to engage the overhanging part of the bait-plate.

2. In a trap of the class described having in combination a platform, a cover pivoted thereto, a bait-plate pivotally connected to the platform and provided with an overhanging end, a trigger also pivotally connected to the platform and adapted to engage the overhanging end of the bait-plate, a plate extending between the trigger and said plate, and a link connection pivotally connected to the cover and having a bent end for engaging the plate extending between the trigger and the bait-plate, whereby when the trigger is released the cover will be permitted to fall as described.

FREDERICK BEAUDRY.

Witnesses:
WM. H. CHAPIN,
K. I. CLEMONS.